April 3, 1934.  C. E. JENKINS  1,953,714
FRUIT JUICE EXTRACTOR
Filed Sept. 23, 1930   2 Sheets-Sheet 2

Inventor
CLARENCE E. JENKINS
By
Attorneys

Patented Apr. 3, 1934

1,953,714

UNITED STATES PATENT OFFICE 1,953,714

FRUIT JUICE EXTRACTOR

Clarence E. Jenkins, Keene, N. H., assignor of one-half to Brooke L. Jarrett, Pittsburgh, Pa.

Application September 23, 1930, Serial No. 483,932

21 Claims. (Cl. 146—3)

This invention relates to improvements in fruit juice extractors of the type employed for reducing the solid fruit to pulp and preparing and separating a liquid therefrom.

One of the objects of the present invention is to provide a structure in which the juice is excluded from the action of air as much as practicable during the operation of separating it from the fruit.

Another object of the present invention is to provide a simple and automatically operating pulping or comminuting device for the fruit.

A further object of the invention is to provide a fruit comminuting device in conjunction with a centrifugal filter for separating the juice from the solid portions of the pulp.

Still another object of the invention is to provide a device of the class described with a filter material which may be easily replaced, and in which the filter structure is safeguarded against causing injury to the person effecting the replacement.

A still further object of the invention is to provide a device in which the fruit juice is freed of foam and bubbles before it is delivered into a receptacle for use.

With these and other objects in view as will appear in the course of the following specification and claims, an illustrative form of the invention is set forth on the accompanying drawings in which:

Figure 1:
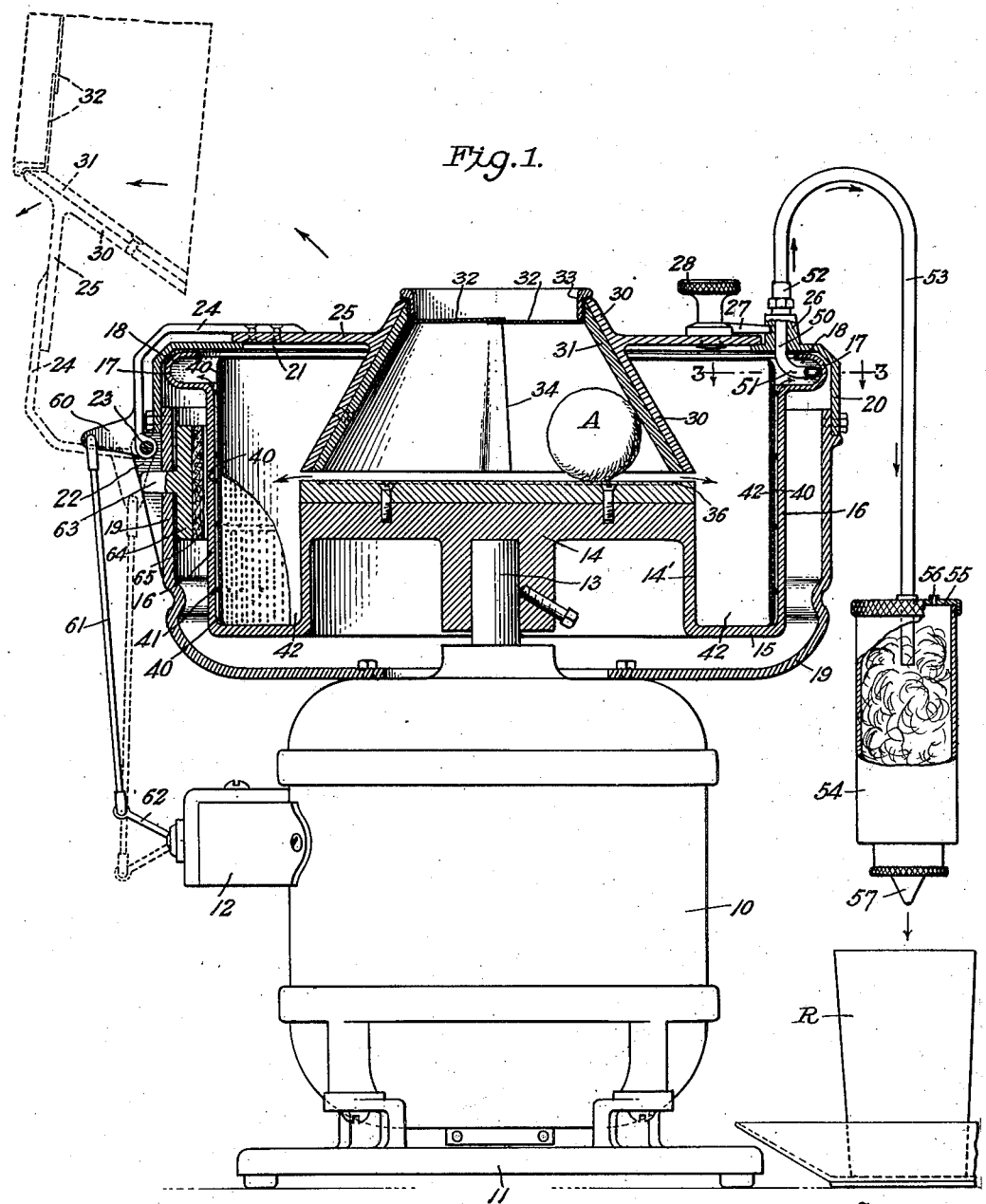
Fig. 1 is a view of the separator in vertical diametrical section, and showing the driving motor in elevation.
Figure 2:
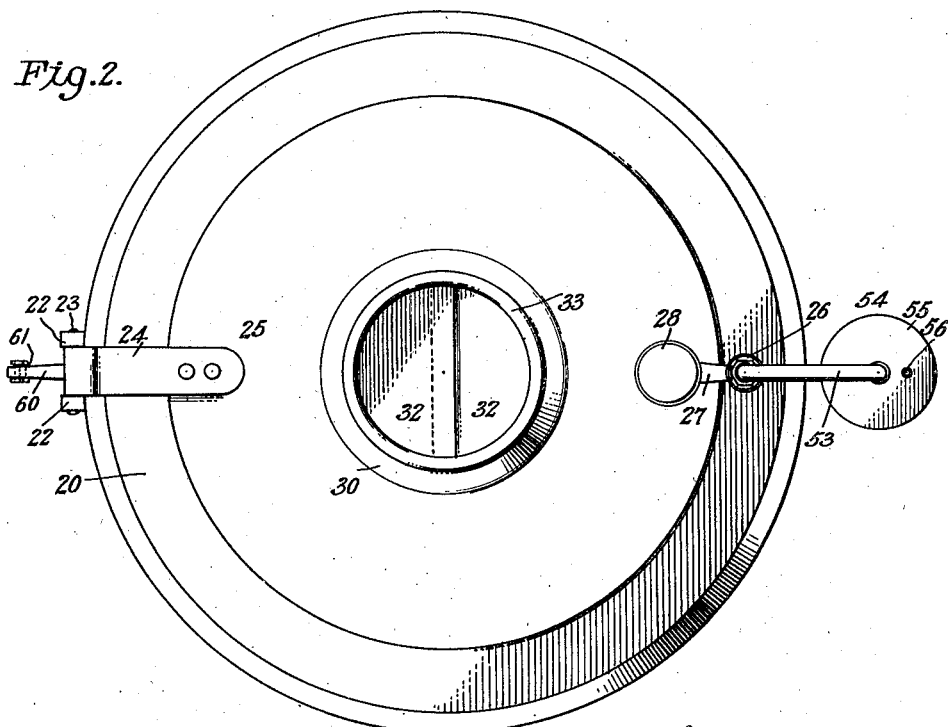
Fig. 2 is a top plan view.

In these drawings the electric motor 10 is mounted on a base 11 for support on a table. The motor is controlled by an "on-and-off" switch 12, and has the vertically upwardly extending stub shaft 13 to which is fixed the hub 14 of a centrifugal drum including the walls 14' and 15 providing a lower pocket and the peripheral wall 16 which terminates adjacent its upper edge in an annular outwardly extending portion 17 providing an internal groove 18. This centrifugal drum is surrounded by a closed protective guard casing 19 which is secured to the top of the motor 10, and in conjunction with a top 20 secured to it, extends around the centrifugal drum and its parts. Outwardly extending ribs 22 of the casing 19 support a pivot 23 for the hinge arm 24 of a cover plate 25 which closes the central opening 21 of the top 20. Diametrically opposite the pivot 23 the top 20 is provided with a boss 26 which has a horizontal kerf or notch therein to receive the finger 27 of the rotatable knob 28 which is mounted on the cover 25, and acts as a catch to hold the cover 25 in its proper closed position.

The cover 25 is formed integrally with a downwardly divergent conical wall 30 which receives an internal conical comminuting sleeve 31. The upper and smaller end of the truncated cone 30 is closed by a split diaphragm trap comprising the two wide rubber bands 32 which overlap at the center and which are held in place by the clamping ring 33.

Figure 4:
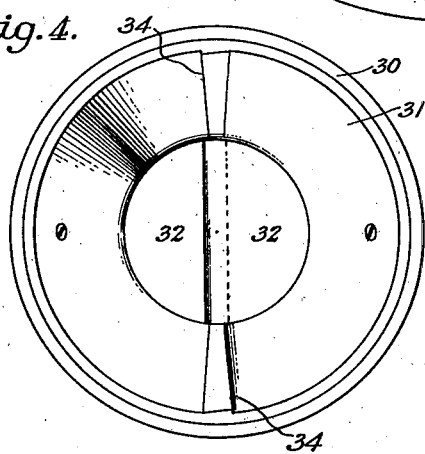
Fig. 4 is a view of the comminuting drum, seen from below.

The comminuting drum 31 has a plurality of inwardly extending turning and cutting edges 34 (Figs. 1 and 4).

The hub 14 of the centrifugal filter has fixed thereto a grinding plate 36 with a roughened upper surface. The upper surface of the grinding plate 36 and the lower edges of the conical members 30, 31 are spaced a slight distance apart for the escape of pulp or juice being comminuted or ground.

Figure 5:
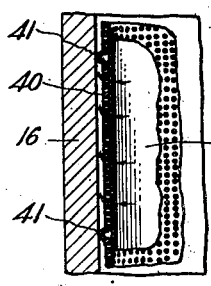
Fig. 5 is a fragmentary detailed view of the filter assembly on a larger scale than a portion of this assembly shown in Fig. 1.

Located closely within the upstanding peripheral wall 16 of the centrifugal filter drum is an annular filtering plate 40 which has a large number of small apertures therethrough, and is provided with a number of outwardly extending bosses or elevations 41 which engage against the inner surface of the peripheral wall 16 and hold the major portion of the filter plate 40 in spaced relation therefrom. A filter paper of paper bibulous consistency is indicated at 42 in Figs. 1 and 5 as located against the inner plate 40. This filter paper 42 may comprise a simple strip of uniform width and of slightly greater length than the inner peripheral surface of the plate 40 so that there is an overlap at its ends. It will be noted that the upper and lower edges of the filter plate 40 are turned inwardly to assist in supporting the filter paper and to prevent the passage of pulp around the edges of the paper.

Figure 3:
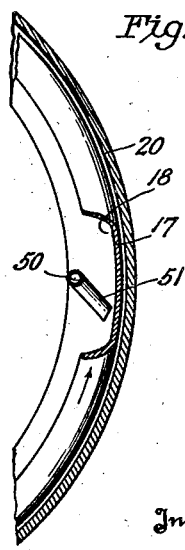
Fig. 3 is a fragmentary detailed sectional view of the withdrawing tube for the juice and its correlation to the centrifugal filter, on line 3—3 of Fig. 1.

The boss 26 has a vertical passage therethrough to receive the deflecting and withdrawal pipe 50 which has its lower end 51 bent radially outwardly and arranged counter to the direction of movement of the filter drum portion 17, and the filter plate 40 (Fig. 3) and located in the groove 18 so that the liquid as it is carried around in the groove 18 with the wall 17 thereof is brought to the mouth of the lower end 51 of this withdrawal pipe and thus is forced outwardly through the pipe 50 to the connection 52 and thence through the U-shaped discharge pipe 53 into the foam reducing device 54 which comprises a covered container of sufficient volume to receive a quantity of the liquid and foam. The cover member 55 has a minute air escape orifice 56 therein while the lower end has a nozzle 57 through which the juice escapes into a glass or similar receptacle R located there-beneath.

The projecting finger 60 of the hinge plate 24 is pivotally connected to a link 61 extending downwardly to the operating arm 62 of the toggle switch 12. A plunger 63 is slidably mounted in the casing 19 for radial movement therein, being provided on its inner end with a brake shoe 64 having a lining 65 opposite the peripheral wall 16.

In operation, an apple A or similar fruit may be inserted into the machine by forcing it between the two halves 32 of the split diaphragm, so that it drops into the space beneath the same and onto the plate 36. The diaphragm immediately closes and thus excludes the general access of air into the interior of the machine. With the motor in operation, the grinding disc 36 is turning while the apple A is retarded by its contact with the inner wall of the conical member 31, so that a rapid grinding and comminuting into pulp occurs, the apple being turned from time to time by the edges 34. As the pulp forms it is projected radially outward by the plate 36 and against the filter paper 42, the juice being strained therefrom and passing through the filter plate 40 into the space between this plate and the peripheral wall 16 from which it passes into the annular groove 18 and thence through pipes 50 and 53 to the foam reducer 54 and continues into the receptacle R. It will be noted that any required number of apples, for example, may be introduced in succession into the grinding device without interrupting the operation.

After a period of use during which the filter paper 42 has become charged with pulp so that it no longer is an efficient filter, the knob 28 is rotated to release the cover 25 and the latter is swung upwardly into the dotted line position of Fig. 1. The whole interior of the drum 31 is now open for inspection and cleansing, as well as the grinding plate 36 and associated parts. Likewise, the filter paper 42 may be removed with its pulp, and a new filter paper substituted by a very simple operation.

It will be noted that a safeguard is provided against injury to the person performing this operation in that the movement of the cover 25 to the open position is accompanied by a downward movement of the link 61 and therefore an opening of the control switch 12 of the motor 10: and at the same time the lug 60 engages the plunger 63 and applies the brake lining 65 against the peripheral wall 16 of the rotating drum. Thus not only is the drum brought to a standstill by the action of the brake but its driving motor is disconnected from the circuit.

It is obvious that the invention is not limited solely to the form of construction shown in the drawings but that it may be modified in many ways within the scope of the appended claims.

I claim:

1. In a fruit juice extractor, a grinding disk mounted to rotate about a vertical axis, means to drive said disk so that the fruit pulp and juice are thrown from the disk, a peripheral wall to receive the pulp and juice from the disk and driven with said disk and including a filter member whereby the pulp is centrifuged immediately after it is ground and the juice expelled centrifugally through the filter member, and means to collect the juice which has passed through said filter member.

2. In a fruit juice extractor, an outer shell, a revoluble member mounted on a vertical axis and comprising a bowl having a grinding disk formed in its bottom, a fixed cover mounted above said disk and including walls carried therein and projecting down inside the shell and terminating above the grinding disc for providing a fruit receiving chamber to hold the fruit in contact with said disk, and a substantially air-tight closure for said chamber mounted on said cover.

3. An extractor as in claim 2, in which the chamber is substantially circular in horizontal section, and said walls have inwardly extending fruit turning devices.

4. An extractor as in claim 2 in which the chamber is formed as an upwardly convergent conical frustrum.

5. In a fruit juice extractor, a grinding member mounted to rotate about an axis, means to drive said member so that the ground fruit pulp and juice are thrown therefrom, means to hold fruit against said member, a peripheral wall rotatable with said member and surrounding the same, a perforated filter support including a plurality of outwardly extending projections, said support being located within said wall so that the projections hold said support in spaced relation to the wall, and a filtering element supported by the inner surface of said support in position to receive the pulp and juice from said member.

6. An extractor as in claim 5, in which the filter element is in strip form and is located on said spacer with its ends overlapping.

7. An extractor as in claim 5, including a casing surrounding said member and wall, and a cover member releasably mounted on said casing and supporting said fruit holder, whereby the opening of said cover will permit access to the interior of said wall for the replacement of said filter element.

8. In a fruit juice extractor, a flat grinding disk mounted to rotate about a vertical axis, a peripheral wall connected to said disk to rotate therewith and including a filter member and adapted to receive pulp from the disc, a relatively stationary cover, upwardly convergent frustro-conical walls carried by said cover to provide a fruit receiving chamber to hold the fruit in contact with said disk, the lower edge of said walls terminating short of said disk so that the fruit pulp and juice may be thrown against said filter.

9. In a fruit juice extractor, a hub mounted to rotate about a vertical axis, a peripheral wall of circular horizontal section connected to said hub, a disk having a toothed surface fixed to said hub with the horizontal plane of its upper surface substantially opposite the mid-height of said wall whereby pulp and juice from the disc are discharged centrifugally against said wall, means to hold fruit in contact with said disk, and a filter carried on the inner side of said wall.

10. In a fruit juice extractor, a grinding disk mounted to rotate about a vertical axis, a cylindrical peripheral wall fixed to said grinding disk and rotatable therewith, a casing surrounding said wall, a removable cover to close the upper end of said casing, an upwardly convergent frustro-conical wall fixed to said cover and extending down inside said peripheral wall to within a short distance of said disk, and an air-tight closure for the upper end of said frustro-conical wall.

11. In a fruit juice extractor, a grinding disk mounted to rotate about a vertical axis, a coaxial cylindrical peripheral wall connected to said disk to rotate therewith, said disc and wall forming a bowl and comprising a centrifuge, and an upwardly convergent frustro-conical wall mounted in relatively fixed position above said disk and within the bowl to provide a space therebetween, said wall providing a receiving chamber of greater size than the fruit so that the fruit is engaged by said disk and the inner surface of said wall and thereby rotated into different successive positions while being ground.

12. A machine for disintegrating and centrifuging vegetable substances and the like, comprising a bowl having a grinding disc formed in the bottom thereof, means for rotating the grinding disc, and a relatively fixed hopper extending down inside the bowl and positioned over the grinding disc and having side wall portions which form an acute angle with the surface of the grinding disc.

13. In an apparatus of the class described, a rotatable bowl having a disintegrating disc in the bottom portion thereof, and a holder above the disc extending down inside the bowl having wall portions which form an acute angle with the disc, the bottom of the holder terminating above the disc and in close proximity thereto, the rotation of the disc serving to wedge fruit or the like being disintegrated into said acute angle portion, the space between the holder and the bowl permitting pulp and juice to be discharged laterally by centrifugal action to the sides of the bowl.

14. In an apparatus of the class described, a rotatable disintegrating disc, and a holder of upwardly decreasing cross-sectional area above the disc having wall portions which form an acute angle with the disc, the bottom of the holder terminating above the disc and in close proximity thereto, the rotation of the disc serving to wedge fruit or the like being disintegrated into said acute angle portion, a portion of the wall of said holder extending inwardly closer to the axis of rotation of the disc than another portion thereof, whereby fruit or the like being carried around the interior of the holder by engagement with the disc is forced inwardly toward the center of the disc at a point in its travel around with the disc.

15. An apparatus of the class described comprising a rotatable bowl having a disintegrating disc therein, and a substantially conical holder having distorted internal side wall portions, said holder being positioned above the disc and terminating close to the top thereof and of an overall internal diameter which is approximately the same as the diameter of the grinding disc, the distorted portion of the conical wall being such that fruit carried around inside the holder with the rotation of the disc is forced inwardly toward the center of the disc by engagement with such distorted portion, the space between the holder and the disc permitting the juice and pulp to be discharged laterally from the disc toward the sides of the bowl.

16. A device for disintegrating and centrifuging vegetable substances and the like comprising a rotatable bowl member supported for rotation about a vertically extending axis, means for rotating the bowl member, said bowl member having a peripheral side flange portion with a juice receiving groove in the top thereof, a raised bottom portion on the inside of the bowl of less diameter than the internal diameter of the bowl and providing a grinding disc, a fruit holder positioned over the grinding disc, a circular filter within the bowl spaced away from the raised bottom portion and spaced inwardly from said side portion of the bowl, and means for removing juice which accumulates in said groove.

17. A device for disintegrating and centrifuging vegetable substances and the like comprising a rotatable bowl member supported for rotation about a vertically extending axis, means for rotating the bowl member, said bowl member having a peripheral side flange portion with a juice receiving groove in the top thereof, a raised bottom portion on the inside of the bowl of less diameter than the internal diameter of the bowl and providing a grinding disc, a fruit holder positioned over the grinding disc, a circular filter within the bowl spaced away from the raised bottom portion and spaced inwardly from said side portion of the bowl, and means for removing juice which accumulates in said groove, said filter screen being removable.

18. A device for disintegrating and centrifuging vegetable substances and the like comprising a rotatable bowl member supported for rotation about a vertically extending axis, means for rotating the bowl member, said bowl member having a peripheral side flange portion with a juice receiving groove in the top thereof, a raised bottom portion on the inside of the bowl of less diameter than the internal diameter of the bowl and providing a grinding disc, a fruit holder positioned over the grinding disc, a circular filter screen within the bowl spaced away from the raised bottom portion and spaced inwardly from said side portion of the bowl, and means for removing juice which accumulates in said groove, said filter screen comprising a perforated removable supporting wall and a removable filter sheet on the inside of said wall.

19. A device for disintegrating and centrifuging vegetable substances and the like comprising a rotatable bowl member supported for rotation about a vertically extending axis, means for rotating the bowl member, said bowl member having a peripheral side flange portion with a juice receiving groove in the top thereof, a raised bottom portion on the inside of the bowl of less diameter than the internal diameter of the bowl and providing a grinding disc, a fruit holder positioned over the grinding disc, a circular filter screen within the bowl spaced away from the raised bottom portion and spaced inwardly from said side portion of the bowl, means for removing juice which accumulates in said groove, said holder having an opening through the top thereof and being supported on a hinged cover which closes the top of the bowl, and a self-closing closure for the top of the holder.

20. A device for disintegrating and centrifuging vegetable substances and the like, comprising a rotatable bowl member supported for rotation about a vertically extending axis, said bowl member having slightly tapering walls whereby the diameter of the bowl increases in the direction of the axis of the bowl, said bowl having an annular juice receiving groove therein at its point of greatest diameter, means for rotating the bowl, a grinding disc in the bowl secured thereto for rotation therewith, said disc being of less diameter than the internal diameter of the bowl, a fruit holder positioned over the grinding disc and having its lower edges in spaced relation thereto, a circular filter within the bowl spaced away from the walls thereof, and means for removing juice from said juice receiving groove.

21. In a centrifuge device, a shaft, a bowl-like member on the end of the shaft, a grinder element in the bowl-like member mounted for rotation therewith, and a relatively fixed material holder extending into the bowl and terminating in spaced relation to the grinder element, the material holder and grinding element being so positioned that the material in the holder which is disintegrated by the grinder element is discharged centrifugally toward the sides of the bowl.

CLARENCE E. JENKINS.